United States Patent [19]

Portnoff

[11] 4,246,617

[45] Jan. 20, 1981

[54] DIGITAL SYSTEM FOR CHANGING THE RATE OF RECORDED SPEECH

[75] Inventor: Michael R. Portnoff, Somerville, Mass.

[73] Assignee: Massachusetts Institute of Technology, Cambridge, Mass.

[21] Appl. No.: 62,027

[22] Filed: Jul. 30, 1979

[51] Int. Cl.³ .............................................. G11B 5/00
[52] U.S. Cl. ......................................... 360/32; 360/8
[58] Field of Search .................................. 360/32, 8

[56] References Cited

U.S. PATENT DOCUMENTS 3,777,308   12/1973   Borkovosky et al. ................ 360/32

Primary Examiner—Vincent P. Canney

Attorney, Agent, or Firm—Arthur A. Smith, Jr.; Martin M. Santa

[57] ABSTRACT

Representation of a speech signal by its short-time Fourier transform and the application of this representation to the problem of time compression and expansion of speech are presented. A time-frequency representation for linear time-varying systems is applied to a model for speech production to formulate a quasi-stationary representation for the speech waveform. This representation has the property that simple time scaling of the parameters of the representation corresponds to changing the rate of the speech. Given a real speech signal, short-time Fourier analysis provides a technique for estimating and modifying these parameters. The results of the theoretical analysis are used to design a high-quality speech rate-change system which are simulated on a general-purpose digital mini-computer.

4 Claims, 3 Drawing Figures

DIGITAL SYSTEM FOR CHANGING THE RATE OF RECORDED SPEECH

The Government has rights in this invention pursuant to Contract No. N00014-75-C-0951 awarded by the Department of the Navy.

BACKGROUND OF THE INVENTION

This invention relates to the problem of time-scale modification of speech and more particularly to a speech analysis/synthesizer system based on short-time Fourier analysis. The objective is the development of a high-quality system for changing the rate of speech. The system must preserve such qualities as naturalness, intelligibility, and speaker dependent features. Furthermore, the system must not introduce objectionable artifacts often present in vocoded speech. Finally, the system should also be robust to noise, i.e., the performance of the system should not degrade severely if the source speech is corrupted by noise, as might occur in recordings of meetings or court-room proceedings.

The ability to modify the rate of speech is desirable for many reasons. The rate at which speech can be produced is constrained by physiological limitations to a maximum rate of about 110 to 180 wpm. However, the rate at which speech can be comprehended is, typically, about 2 to 3 times this rate. Furthermore, without rate change, the rate of listening is completely paced by the recording and is not controllable by the listener. Consequently, the listener cannot scan or skip sections of the recording in the same manner as scanning printed text, nor can the listener slow down difficult-to-understand portions of the recording that might arise in the context of second language learning, or in listening to degraded speech. Clearly, the ability to modify the rate of (recorded) speech, while retaining its natural quality and intelligibility, would obviate these problems and have numerous applications. The modification of a speech signal such that the resulting signal differs from the original only by its perceived rate of articulation will, henceforth, be referred to as time-scale modification or rate change of speech.

Although there are a number of presently available techniques for changing the rate of speech, they all introduce artifacts which degrade the quality of the processed speech. The most naive approach to time scaling speech is simply to play back recorded speech at a speed different from that at which it was recorded. The problem here is obvious. Even with a small change in speed, spectral distortion is perceptible. As the difference between the record and playback speed is increased, the intelligibility deteriorates rapidly. It is interesting to note that while msot people are familiar with this effect, the time-scaled speech is generally described as changed in pitch. Although the pitch is, of course, changed, so is the spectral envelope of the speech. In fact, it is probably the frequency scaling of the spectral envelope and the corresponding shift in formant frequencies that contributes most to the degradation of the speech.

For the most part, nearly all algorithms for changing the rate of speech have been based on rate changes of speech by periodically repeating or discarding sections of the speech waveform. The duration of each section is chosen to be at least as long as one pitch period, but shorter than the length of a phoneme. This technique introduces discontinuities at the section boundaries which are perceived as "burbling" distortion and overall signal degradation.

The most popular refinement of the technique of the previous paragraph is pitch-synchronous implementation. Specifically, for portions of the speech that are voiced, the sections of speech that are repeated or discarded correspond to pitch periods. Although this scheme produces more intelligible speech than the basic asynchronous pitch-independent method, errors in pitch marking and voiced-unvoiced decisions introduce objectionable artifacts. Moreover, since the ear is sensitive to these types of errors, and since pitch marking algorithms are generally sensitive to noise present in the speech, such algorithms would not be expected to be robust for noisy speech. Furthermore, even with no such detection errors, discontinuities may still be introduced.

Perhaps the most successful variant of the prior-art method is a method which uses a crude pitch detector, followed by an algorithm which repeats or discards sections of the speech equal in length to the average pitch period, then smooths together the edges of the sections that are retained. Because the method is not pitch synchronous, and therefore, does not require pitch marking, it is more robust than pitch-synchronous implementations, yet much higher quality than pitch-independent methods.

Time-scale modification of speech based on classical vocoder methods is an obvious approach. The speech would be represented by a set of time-varying parameters obtained as the output of the vocoder analyzer, the parameter tracks would be time scaled, and the rate-changed speech would then be generated by the vocoder synthesizer. However, because the fundamental consideration in the formulation of a vocoder is bandwidth reduction, the vocoders currently available in the prior art simply do not provide the high level of speech quality and naturalness we seek to attain. For example, a large class of vocoders require voiced-unvoiced decisions and pitch extraction. The resulting detection errors introduce artifacts in which the ear is particularly sensitive and which are not tolerable for our purpose.

Of the remaining classical vocoders, the only one that does not require voiced-unvoiced decisions and pitch extraction, yet is flexible enough to permit rate changes of speech is the phase vocoder. The phase vocoder is a speech analysis/synthesis system based on short-time Fourier analysis and, unlike most vocoders, can be formualted to be an identity system in the absence of parameter modification. Furthermore, there is evidence that the ear is much less sensitive to errors, in the short-time spectrum of an acoustic signal than to errors in the time-domain waveform. Unfortunately, because the theory of short-time Fourier analysis and its application to speech signals is not well understood, previous applications of the phase vocoder to changing the rate of speech generally did not achieve the quality potentially attainable from this prior art technique but which is now provided by the present invention.

SUMMARY OF THE INVENTION

A digital speech signal is obtained by sampling a band limited analogue speech signal at twice the highest frequency of the analogue signal and applying conventional analogue-to-digital conversion techniques. The resulting digital signal is analyzed by short-time Fourier analysis to provide a plurality of frequency channels with complex (real and imaginary components) digital signals. Each such frequency channel corresponds to a band of frequencies of the original speech demodulated down to base band (zero frequency) and low pass filtered by an analysis filter. Because the channel signals have been low pass filtered by the analysis filter, the sampling rate of each channel may be reduced by the factor R provided that $2\pi/R$ is greater than twice the cut off frequency (in radians) of the analysis filter.

Each sample of the analyzer output channels has a magnitude and phase that can be determined from its real and imaginary components. Further, for each of these channel signals an instantaneous frequency can be defined, based on the time-rate of change of successive phase values. An "unwrapped phase" sequence can be constructed by integrating (summing) all past values of the instantaneous frequency up to the current time. The instantaneous frequency is defined in such a manner as to yield samples of a smooth unwrapped phase curve, without jumps or discontinuities.

If it is desired to change the rate of the speech by the factor $\beta$, then each of the short-time Fourier analyzer channels are modified in such a manner that the magnitudes and instantaneous frequencies of the modified signals correspond to samples of the magnitudes and instantaneous frequencies taken with the sampling interval $\beta R$ rather than the interval R.

The modified digital channel signals are used as inputs to a short-time Fourier synthesizer that generates a digital signal corresponding to samples of the desired rate-changed speech. The synthesizer, in effect, interpolates each of the digital channel signals by 1:R by means of band limited interpolation, modulates each of the resulting low-pass signals back to its original center frequency to obtain a set of band pass digital signals, and sums each of these band pass signals to obtain the desired digital output signal. The samples of short-time Fourier synthesizer output are used to generate an analogue time signal by means of a conventional digital-to-analogue coverter. The resulting analogue signal is changed in rate by the factor $\beta$ while still having the same pitch contour and short-time spectral characteristics.

DETAILED DESCRIPTION OF PREFERRED EMBODIMENT

The Analysis/Synthesis System

Figure 1:
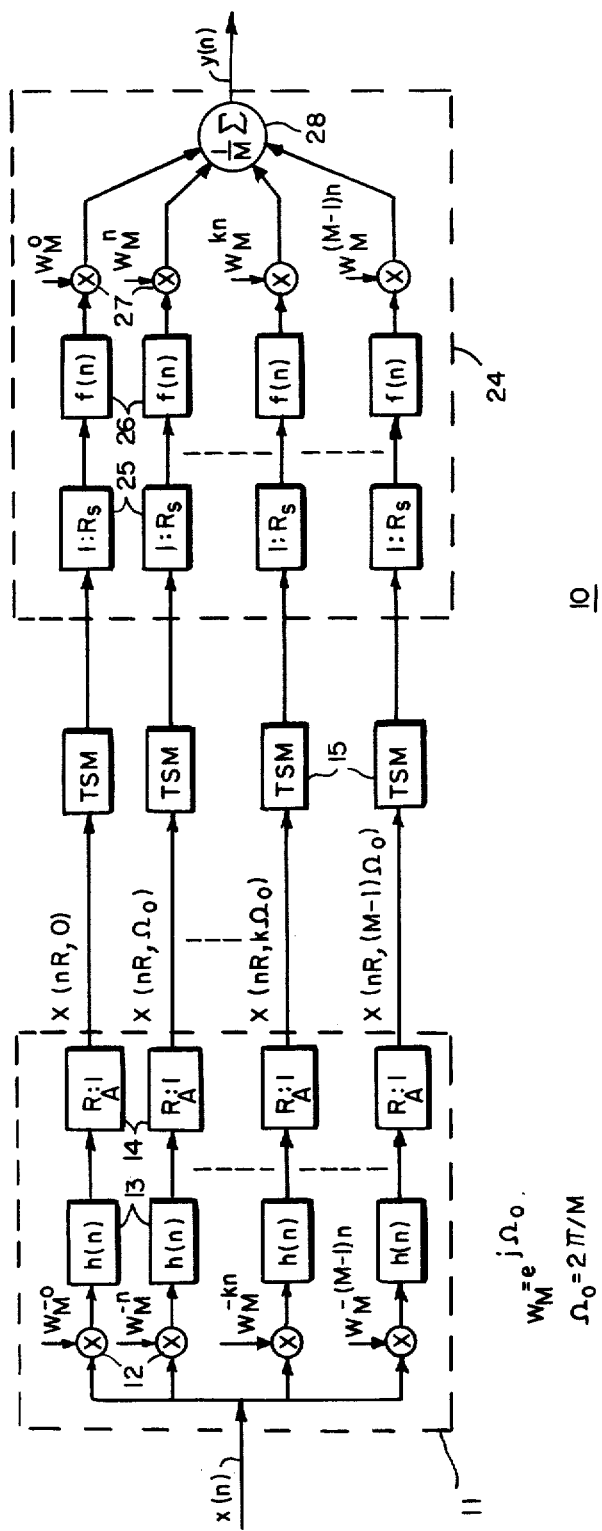
FIG. 1 is a block diagram showing the processing steps in the digital speech rate-change system.
Figure 2:
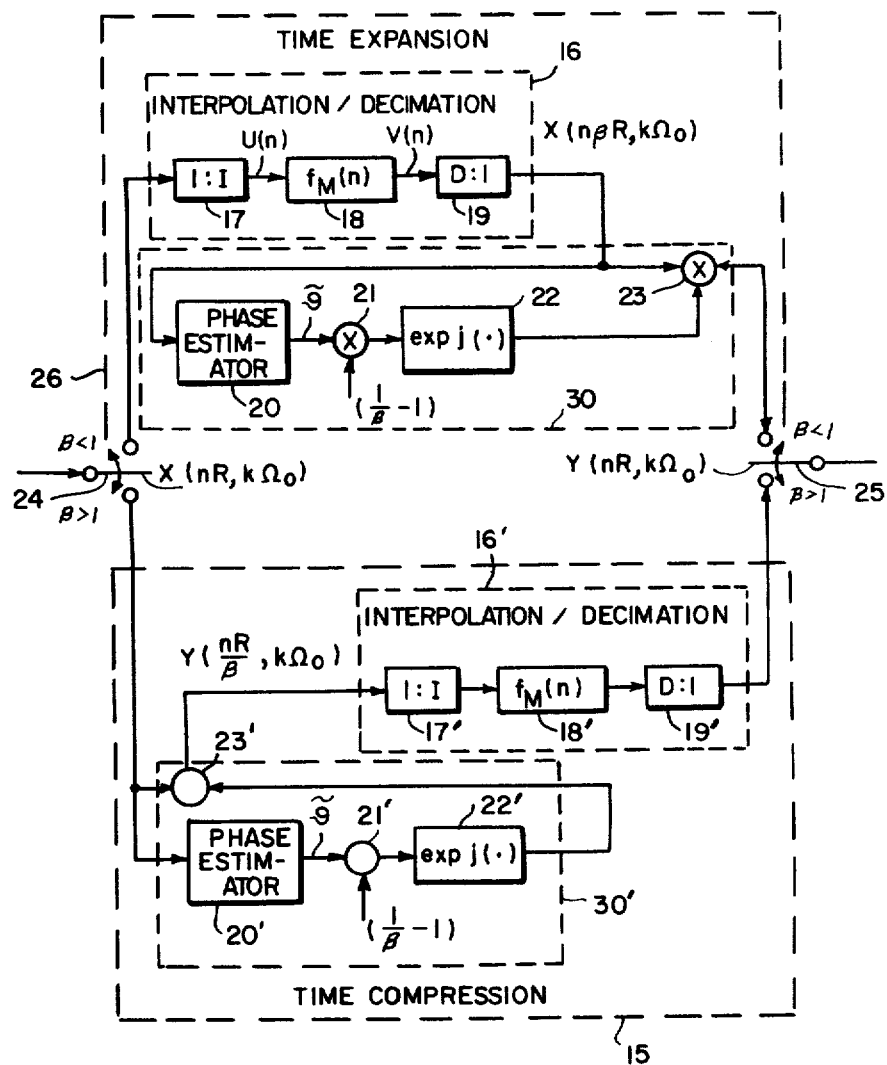
FIG. 2 is a block diagram showing the processing steps for time expansion and time compression in the time-scale modification process.

The analysis/synthesis system represents a given speech-signal in terms of its complex discrete short-time Fourier transform. Such a system, when applied to speech coding, is generally referred to as a phase vocoder. With appropriate analysis and synthesis filters and proper sampling rates, the samples of the short-time Fourier transform are related to the underlying parameters of the speech signal and, thus, provide a tool for manipulating these parameters.

For a given input signal, $x(n)$ the short-time Fourier analyzer calculates samples of the short-time Fourier transform $$X_2(sR,k\Omega_o) = \sum_{r=-\infty}^{\infty} h(sR - m) \times (m)\exp[-j\Omega_o km] \quad (1)$$

where $h(n)$ denotes the analysis filter impulse response, $\Omega_o = 2\omega/M$ represents the spacing of the samples in frequency, and R, the spacing of the samples in time. In fact, the analyzer calculates the samples $X_2(sR,k\Omega_o)$ efficiently with the FFT algorithm as discussed in reference 1, 2, incorporated herein by reference.

The short-time Fourier synthesizer calculates samples of the time sequence, $y(n)$, from samples of the modified short-time Fourier transform, $Y_2(sR,k\Omega_o)$, according to the formula $$y(n) = \frac{1}{W} \sum_{k=0}^{M-1} \sum_{S=-\infty}^{\infty} f(n - sR) Y_2(sR,k\Omega_o)\exp[j\Omega_o nk] \quad (2)$$

The synthesis is also implemented efficiently using the FFT algorithm as described in reference 1 and 2.

DESIGN OF THE ANALYSIS FILTER

The analysis filter, $h(n)$, must be sufficiently narrow band in frequency to resolve the "spectral features" of the speech, i.e., the bandwidth of $H(\omega)$ must be less than the spacing, in frequency, of the harmonics of the voiced portions of the speech, and small enough that the time-varying power spectrum of the unvoiced portions of the speech is smooth over any frequency interval smaller than this bandwidth. In addition, $H(\omega)$ must be sufficiently wide band to pass the temporal features of the speech. A final requirement on the analysis filter is dictated by the practical consideration of keeping the number of frequency samples small. Because the number of frequency samples, M, must be increased as the duration of $h(n)$ is increased to prevent time aliasing of the processed signal, $h(n)$ should have finite duration and be as short as possible.

In order to minimize the effects of time-domain aliasing in the discrete-transform implementation, a finite length Hamming window was chosen as the analysis filter $h(n)$. If N denotes the duration of $h(n)$, then $H(\omega)$ is approximately bandlimited to $4\omega/N$, i.e., the width of the main lobe of $H(\omega)$ is approximately $8\omega/N$ and the peak amplitude of the side lobes is $-41$ dB. If the samples $X_2(sR,k\Omega_o)$ are to represent $X_2(n,k\Omega_o)$ with no aliasing, then the temporal sampling interval, R, must be chosen less than $N/4$. Calculating $X_2(sR,k\Omega_o)$, therefore, corresponds to sliding $h(n)$ by no more than one fourth of its length for each FFT frame. In order to unwrap the phase of the short-time Fourier transform, however, it can be shown that it is necessary to sample at twice the Nyquist rate for $X_2(n,k\Omega_o)$. Thus, for our system, we choose $$R \leq N/8 \quad (3)$$

DESIGN OF THE SYNTHESIS FILTER

Because the non-linear modification to be performed on the short-time Fourier transform does not, in general, preserve the structure of the short-time Fourier transform, the synthesized signal depends on the design of $f(n)$. The interpretation of the discrete short-time Fourier transform as samples of the output of the band-limited analysis filter, h(n), implies that $X_2(n,k\Omega_o)$ can be reconstructed from its samples $X_2(sR,k\Omega_o)$ by 1:R bandlimited interpolation. This result is valid for the modified short-time Fourier transform, as well, provided that the modification does not cause frequency aliasing of the sampled transform. The synthesis filter, f(n), is, therefore, chosen as a 1:R optimal finite duration impulse response (FIR) bandlimited interpolating filter in order to guarantee proper interpolation of the speech parameters imbedded in the modified short-time Fourier transform.

DESIGN OF THE PARAMETER MODIFICATION SYSTEM

The modification of the short-time Fourier transform used to effect rate changes of speech consists of two basic procedures: linear time scaling and phase modification. The effect of these procedures is to linearly expand or compress the time scale of the magnitude and instantaneous frequency of the short-time Fourier transform. Because the order in which these procedures are applied to the data depends on whether the speech is to be expanded or compressed in time, the details of these two procedures will be considered individually, then their combination and incorporation into the overall processing scheme will be considered.

LINEAR TIME SCALING

In order to effect a rate change, by the factor $\beta$, in the synthesized signal, the magnitude and phase of the short-time Fourier transform must be linearly time scaled by the factor $\beta$. Because the magnitude and phase are obtained by non-linear operations on the short-time Fourier transform, these quantities have greater bandwidths than the real and imaginary parts of the short-time Fourier transform. Consequently, the linear time scaling is implemented by applying bandlimited decimation/interpolation techniques* to the real and imaginary parts of the short-time Fourier transform. The interpolating filter, denoted $f_M(n)$, is again designed as an optimal FIR interpolating filter.
*Reference 3 incorporated herein by reference.

Assuming the rate-change scale factor $\beta$ is a rational number, expressed as $$\beta = D/I \qquad (4)$$

bandlimited decimation/interpolation amounts to the direct evaluation of the sum $$X_2(\beta sR, k\Omega_o) = \sum_{r=-\infty}^{\infty} f_M(sD - rI) X_2(rR, k\Omega_o) \qquad (5a)$$

for the short-time Fourier transform, and $$Y_2(sR, k\Omega_o) = \sum_{r=-\infty}^{\infty} f_M(sD - rI) Y_2(rR/\beta, k\Omega_o) \qquad (5b)$$

for the modified short-time Fourier transform. This procedure is efficient because $f_M(n)$ has finite duration and the sum need only be evaluated once to compute each value of $X_2(\beta sR, k\Omega_o)$ or $Y_2(sR, k\Omega_o)$.

PHASE MODIFICATION

It can be shown that the short-time Fourier transform of speech can be expressed as $$X_2(n,\omega) = a(n,\omega)\exp[j\phi(n,\omega)]$$

where $\phi(n,\omega)$ is referred to as the fm component of the phase of the short-time Fourier transform and denotes that component of the phase which has a slowly varying slope (or first difference); and $a(n,\omega)$ is a complex function which varies slowly in n. The second procedure in modifying the short-time Fourier transform is dividing the fm component of the phase by the factor $\beta$. Specifically, given samples of the short-time Fourier transform expressed as $$X_2(sR',k\Omega_o) = a(sR',k\Omega_o)\exp[j\alpha(sR',k\Omega_o)] \qquad (6)$$

where the temporal sampling interval is $R'=R$ or $R'=\beta \cdot R$, depending upon whether the phase modification is performed before or after the linear time-scaling operation, we wish to calculate the samples $$Y_2(sR'/\beta, k\Omega_o) = a(sR', k\Omega_o)\exp[j\alpha(sR', k\Omega_o)/\beta] \qquad (7)$$

Implementing this modification requires first estimating samples of the unwrapped fm phase component, $\alpha(n,\omega)$, from samples of the principal value of the phase of the short-time Fourier transform. If $$X_2(n,\omega) = a(n,\omega)\exp[j\theta(n,\omega)]$$
$$= A(n,\omega)\exp[j(\alpha(n,\omega) + \theta(n,\omega))]$$
$$= A(n,\omega)\exp[j\theta(n,\omega)]$$

where $$a(n,\omega) = A(n,\omega)\exp|j\alpha(n,\omega)|$$

and $$A(n,\omega) = |a(n,\omega)| = |X_2(n,\omega)|$$

$$\alpha(n,\omega) = \arg[\alpha(n,\omega)]$$

$$\theta(n,\omega) = a(n,\omega) + \phi(n,\omega) = \arg[X_2(n,\omega)] \qquad (8)$$

then the samples of the fm phase component, $a(n,\omega)$, are to be estimated from samples of the principal value of the phase, denoted $PV[\theta(n,\omega)]$. As a function of n, $PV[\theta(n\omega)]$ contains jumps of $2\pi$ due to the principal-value operator, and jumps of $\pi$ due to sign changes in the real and imaginary parts of $a(n\omega)$. Although the real and imaginary parts of $a(n\omega)$ are slowly-varying functions of n, the phase, $a(n\omega)$ can jump by $\pi$ when the real or imaginary part of $a(n\omega)$ changes sign. Except for these jumps of $\pi$, $a(n\omega)$ is also a slowly-varying function of n. In order to estimate $a(n\omega)$ from $PV[\theta(n\omega)]$, it will be convenient to define the phase functions $\theta_\pi(n\omega)$ and $\alpha_\pi(n\omega)$, corresponding to $\theta(n\omega)$ and $\alpha(n\omega)$ with jumps of integer multiples of $\pi$ removed. Thus, $$\theta_\pi(n\omega) = \alpha_\pi(n\omega) + a(n\omega) \qquad (9)$$

Once $\theta_{90}(n\omega)$ has been determined, $a(n\omega)$ is estimated from $\theta_{90}(n\omega)$ using the property that $\alpha_{90}(n\omega)$ and the first difference of $a(n\omega)$ are both slowly-varying functions of n.

A procedure will now be developed for determining $\theta_\pi(n\omega)$ from $PV[\theta(n\omega)]$, based on the interpretation of the short-time Fourier transform as the output of the low-pass filter h(n). Denoting the first backward difference operator, with respect to n, by $v_n$, the first difference of the principal value of the phase of the short-time Fourier transform is $$v_n PV[\theta(n,\omega)] = PV[\theta(n,\omega)] - PV[\theta(n-1,\omega)] \quad (10)$$
$$= v_n \theta_\pi(n,\omega) + \pi I_1(n,\omega) + 2\pi I_2(n,\omega)$$

where $I_1$ and $I_2$ are integer-valued functions of n and $\omega$ representing the jumps of $\pi$ and $2\pi$ in $PV[\theta(n\omega)]$. Therefore, $v_n\theta_\pi(n\omega)$ differs from $v_n PV[\theta(n\omega)]$ only by an unknown integer multiple of $\pi$. Since $v_n\theta_\pi(n\omega)$ is the instantaneous frequency of $X_2(n\omega)$ and, since $X_2(n\omega)$ is the output of the (low-pass) analysis filter, h(n), $|v_n\theta_\pi(n\omega)|$ is assumed to be less than the cutoff frequency of h(n). If $\omega_h$ denotes the cutoff frequency of h(n), then $$|v_n\theta_\pi(n\omega)| < \omega_h. \quad (11)$$

Furthermore, if $\omega_h < \pi/2$, then $$|v_n\theta_\pi(n\omega)| < \pi/2 \quad (12)$$

and $v_n\theta_\pi(n\omega)$ can be determined from $v_n PV[\theta(n\omega)]$ simply by adding integer multiples of $\pi$ to $v_n PV[\theta(n\omega)]$ until the result satisfies condition (12). $\theta_\pi(n\omega)$ can then be reconstructed by the running sum $$\theta_\pi(n,\omega) = \sum_{r=n_o+1}^{n} v_r\theta_\pi(r,\omega) + \theta_\pi(n_o,\omega) \quad (13)$$

where $n_o$ is an initial time at which $\theta_\pi(n_o,\omega)$ is assumed to be $$\theta_\pi(n_o,\omega) = PV[\theta(n_o,\omega)]$$

For the sampled transform implementation, $$v_s\theta_\pi(sR',k\Omega_o) \approx R' v_n\theta_\pi(n,k\Omega_o)|_{n=sR'} \quad (14)$$

because $v_n\theta(n,k\Omega_o)$ is a slowly-varying function of n. Multiplying both sides of (11) by R' and substituting (14) gives $$|v_s\theta_\omega(sR',k\Omega_o)| < \omega_h R' \quad (15)$$

Now, if $\omega_h R' < \pi/2$, corresponding to choosing the sampling frequency, $2\pi/R'$ greater than $4\omega_h$ (twice the frequency required by the sampling theorem for sampling the output of h(n)), eqn. (10) and condition (12) become $$v_s PV[\theta(sR',k\Omega_o)] = v_s\theta_\pi(sR',k\Omega_o) + \pi I_1'(s,k) + 2\pi I_2'(s,k) \quad (16)$$

and $$|v_s\theta_\pi(sR',k\Omega_o)| < \pi/2 \quad (17)$$

respectively. $v_s\theta_{90}$ (sR',k$\Omega_o$) can, therefore, be determined from $v_s PV[\theta(sR',k\Omega_o)]$ by adding integer multiples of $\pi$ until (17) is satisfied.

The problem of estimating the fm component of the phase, $a(n\omega)$, from $\theta_\pi(n\omega)$ is basically a problem of curve fitting. Since $$\theta_{90}(n\omega) = \alpha_\pi(n\omega) + a(n\omega), \quad (18)$$

where $\alpha_\pi(n\omega)$ is a slowly-varying function of n with $$v_n\alpha_\pi(n\omega) \approx 0.$$

and $a(n\omega)$ has a first difference, $$v_n a_\pi(n\omega) = \Omega(n\omega),$$

which is also a slowly-varying function of n, $\Omega(n\omega)$ is the slope of a first-order polynomial (in n) that locally fits $\theta_\pi(n\omega)$. While there are a variety of approaches to this problem, the technique to be described here was chosen for its simplicity and good performance in the actual system.

The first backward difference of eqn. (18) is given by $$V_n\theta_\pi(n,\omega) = v_n a_\pi(n,\omega) + v_n\phi(n,\omega) \quad (19)$$
$$= v_n a_\pi(n,\omega) + \Omega(n,\omega)$$
$$\approx \Omega(n,\omega)$$

and the first forward difference by $$\Delta_n\theta_\pi(n,\omega) = \theta_\pi(n+1,\omega) - \theta_\pi(n,\omega) \quad (20)$$
$$= \Delta_n a_\pi(n,\omega) + \Delta_n\delta(n,\omega)$$
$$= \Delta_n a_\pi(n,\omega) + \Omega(n+1,\omega)$$
$$\approx \Omega(n,\omega)$$

A reasonable estimate for $\widetilde{\Omega}(n,\omega)$, denoted $\Omega(n,\omega)$, is, therefore, the average of (19) and (20), given by $$\widetilde{\Omega}(n,\omega) = \tfrac{1}{2}[\Delta_n + v_n]\theta_\pi(n,\omega)$$
$$= \tfrac{1}{2}[\theta_\pi(n+1,\omega) - \theta_\pi(n-1,\omega)]$$
$$= \mu\delta_n\theta_\pi(n,\omega)$$

where $\mu\delta_n = (\tfrac{1}{2})[\Delta_n + v_n]$ is known as the mean central-difference operator. In practice, since $$\Delta_n\theta_\pi(n,\omega) = v_n\theta_\pi(n+1,\omega)$$

$\theta_\pi(n,\omega)$ is never actually computed from (13), but $\widetilde{\Omega}(n,\omega)$ is computed directly as the average of the forward and backward differences $$\widetilde{\Omega}(n,\omega) = \tfrac{1}{2}[\Delta_n + v_n]\theta_\pi(n,\omega) \quad (21)$$
$$= \tfrac{1}{2}[v_n\theta_\pi(n+1,\omega) + v_n\theta_\pi(n,\omega)].$$

The estimate $\Gamma(n,\omega)$, for the fm phase component, is constructed from the running sum $$\gamma(n,\omega) = \sum_{r=1}^{n} \widetilde{\Omega}(r,\omega) \quad (22)$$

where $\Gamma(0,\omega) = \Gamma(0,\omega) = 0$.

For the sampled transform implementation, the estimate for $\Omega(sR',k\Omega_o)$ becomes $$\widetilde{\Omega}(sR',k\Omega_o)R' = \mu\delta_s\theta_\pi(sR',k\Omega_o) \quad (23)$$
$$= \tfrac{1}{2}[\Delta_s + v_s]\theta_\pi(sR',\omega)$$
$$= \tfrac{1}{2}[v_s\theta_\pi(sR' + R',k\Omega_o) + v_s\theta_\pi(sR',k\Omega_o)]$$

and

-continued $$\tilde{\Omega}(sR',k\Omega_o) = \sum_{r=1}^{s} \tilde{\Omega}(sR',k\Omega_o)R' \quad (24)$$

Once the estimate $\tilde{\Gamma}(sR',k\Omega_o)$ of the sampled fm phase component $\Gamma(sR',k\Omega_o)$ is calculated from eqn. (24), samples of the the phase-modified short-time Fourier transform are calculated by adding $(1/\beta-1)\tilde{\Gamma}(sR',k\Omega_o)$ to the phase of $X_2(sR',\Omega_o)$, or equivalently, multiplying $X_2(sR',\Omega_o)$ by $\exp[j(1/\beta-1)\tilde{\Gamma}(sR',k\Omega_o)]$, to obtain $$Y_2(sR'/\beta,k\Omega_o) \simeq a(sR',k\Omega_o)\exp[j\delta(sR',k\Omega_o)]\exp[j(\frac{1}{\beta} - \quad (25)$$
$$1)\delta(sR',k\Omega_o)]$$
$$= a(sR',k\Omega_o)\exp[j(\delta(sR',k\Omega_o) +$$
$$(\frac{1}{\beta} - 1)\delta(sR',k\Omega_o))]$$
$$\simeq a(sR',k\Omega_o)\exp[j\delta(sR',k\Omega_o)/\beta].$$

THE OVERALL MODIFICATION SYSTEM

The linear time scaling and phase modification of the short-time Fourier transform each affect the bandwidth of $X_2(n,\omega)$, considered as a sequence in n for each $\omega$. If the short-time Fourier transform is down-sampled, close to its Nyquist rate, to obtain $X_2(sR,\omega)$, then the order in which the linear time scaling and phase modification are implemented becomes important to prevent frequency aliasing of $X(\psi,\omega)$ in $\psi$. In particular, the bandwidth (in $\psi$) of the time-scaled short-time Fourier transform, $$X_2(\beta n,\omega) = a(\beta n,\omega)\exp[j\Gamma(\beta n,\omega)],$$

is $\beta$ times the bandwidth of the original short-time Fourier transform, $X_2(n,\omega)$. In contrast, the bandwidth (in $\psi$) of the phase-modified short-time Fourier transform, $$Y_2(n/\beta,\omega) = a(n,\omega)\exp[j\Gamma(n,\omega)/\beta],$$

is approximately $1/\beta$ times the bandwidth of $X_2(n,\omega)$. The bandwidth of the modified short-time Fourier transform, $$Y_2(n,\omega) = a(\beta n,\omega)\exp[j\Gamma(\beta n,\omega)/\beta],$$

obtained as the result of both linear time scaling and phase modification is approximately the same as the bandwidth of $X_2(n,\omega)$. Thus, for time-scale expansion ($0<\beta<1$), the linear time-scaling operation decreases the bandwidth of the short-time Fourier transform in $\psi$, while the phase modification operation increases it. Conversely, for time scale-compression ($\beta<1$), the linear time-scaling operation increases the bandwidth of the short-time Fourier transform, while the phase modification decreases it.

Suppose $X_2(n,\omega)$ is represented by its samples $X_2(sR,k\omega_o)$, where R is close to the Nyquist interval for sampling $X_2(n,\omega)$ in n. More precisely, suppose that either $\beta \cdot R$, or $1/\beta \cdot R$ is greater than the Nyquist interval for $X_2(n,\omega)$. Then, in order to prevent frequency aliasing (in $\psi$) when implementing time-scale expansion, the linear time-scaling must be implemented first, followed by the phase modification; conversely, when implementing time-scale compression, the phase modification must be implemented first, followed by the linear time scaling.

IMPLICIT TIME-SCALING

Under certain circumstances, computational savings may be gained by incorporating the linear time-scaling of the short-time Fourier transform into the analysis and synthesis procedures. This method will be called the implicit method for linearly time-scaling the short-time Fourier transform, in contrast to the previously described explicit method and is effected by assuming different temporal sampling rates for the short-time Fourier analysis and synthesis. Let $R_A$ denote the sampling interval at the output of the short-time Fourier analyzer, and $R_S$ the sampling interval assumed by the synthesizer. The output of the analyzer is, therefore, given by $$X_2(sR_A,k\Omega_o) = \sum_{m=-\infty}^{\infty} h(sR_A - m) \times (m)\exp[-j\Omega_o km] \quad (26)$$
$$= a(sR_A,k\Omega_o)\exp[j\theta(sR_A,k\Omega_o)]$$

and the output of the synthesizer given by $$y(n) = \frac{1}{M} \sum_{k=0}^{M-1} \sum_{s=-\infty}^{\infty} f(n - sR_S)Y_2(sR_S,k\Omega_o)\exp[j\Omega_o nk]. \quad (27)$$

If $Y_2(sR_S,k\Omega_o) = Y_2(sR_A/\beta,k\Omega_o)$ is defined as the result of dividing the fm component of the phase of short-time Fourier transform by $\beta$ (with no time-scaling), i.e., $$Y_2(sR_S,k\Omega_o) = a(sR_A,k\Omega_o)\exp[j\Gamma(sR_A,k\Omega_o)/\beta] \quad (28)$$

then substituting eqn. (28) into eqn. (27) gives the expression for the synthesized signal $$y(n) = \frac{1}{M} \sum_{k=0}^{M-1} \sum_{s=-\infty}^{\infty} f(n - sR_S) \times \quad (29)$$
$$a(sR_A,k\Omega_o)\exp[j\delta(sR_A,k\Omega_o)/\beta]\exp[j\Omega_o nk].$$

Assuming $\beta = D/I$, let $R_A = R/I$ and $R_S = R/D$, where R is an integer parameter which specifies the actual sampling intervals such that $R_A$ and $R_S$ are integers. Thus, eqn. (29) becomes $$y(n) = \frac{1}{M} \sum_{k=0}^{M-1} \sum_{s=-\infty}^{\infty} f(n - sR/D) \times \quad (30)$$
$$a(sR/I,k\Omega_o)\exp[j\delta(sR/I,k\Omega_o)/\beta]\exp[j\Omega_o nk].$$

If the sampling parameter R is chosen with careful attention to the issues discussed in the preceding sections, namely, that $X_2(sR_A,k\Omega_o) = X_2(sR/I,k\Omega_o)$ corresponds to samples of $X_2(n,\omega)$ sampled often enough to estimate the fm component of its phase, and $Y_2(sR_S,k\Omega_o) = Y_2(sR/I,k\Omega_o)$ is sampled often enough to prevent aliasing then, if f(n) is a $1:R_S$ bandlimited interpolating filter,-eqn. (30) becomes $$y(n) = \frac{1}{M}\sum_{k=0}^{M-1}\sum_{s=-\infty}^{\infty} a(nD/I, k\Omega_o)\exp[j\delta(nD/I, k\Omega_o)/\beta]\exp[j\Omega_o nk] \quad (31)$$

$$= \frac{1}{M}\sum_{k=1}^{M-1}\sum_{s=-\infty}^{\infty} a(\beta n, k\Omega_o)\exp[j\delta(\beta n, k\Omega_o)/\beta]\exp[j\Omega_o nk].$$

which is the desired rate-changed signal.

Whether or not the implicit method of linearly time-scaling the short-time Fourier transform is more efficient than the explicit method depends primarily on the factor $\beta$. For example, if either D or I is unity, then the implicit method is more efficient, whereas, if D and I are both large integers then the explicit method is generally more efficient. Another consideration in choosing between these two methods is the mode of operation of the system. For example, if the same speech passage is to be processed several times with different rate-change scale factors, i.e., for perceptual studies, then it may be most efficient to perform the analysis once, at a relatively high sampling rate, store the samples of the short-time Fourier transform, and perform the synthesis assuming different sampling rates as described above. Another useful aspect of the implicit method is that it permits exploiting the requirement that the output of the short-time Fourier analyzer is sampled at twice the minimum rate required to avoid frequency aliasing. Thus, for example, time-scale expansion by the factor of 2:1 ($=\frac{1}{2}$) can be implemented simply by modifying the phase of the discrete short-time Fourier transform and performing the synthesis assuming $R_S = 2 \cdot R_A$. Finally, the implicit and explicit methods are easily combined, in practice, to realize the advantages of both.

IMPLEMENTATION OF A TIME-SCALE MODIFICATION SYSTEM

The concepts of the previous sections were employed in an implementation of a complete time-scale modification system for speech. This section discusses some additional details and results of processing real speech signals.

A block diagram of a speech rate-change system /10/ is shown in FIG. 1. The input x(n) is a discrete-time signal obtained by low-pass filtering and analog-to-digital coverting of a recorded speech signal (not shown).

1. Analysis-Synthesis System

Samples of the short-time Fourier transform (STFT) of x(n) are produced by the analyzer /11/ every R samples in time and at M equally spaced frequencies $k\Omega_M = 2\pi k/M$ (k=0, 1, ..., M−1) between 0 and 2 radians. For each frequency the STFT of x(n) may be viewed as a complex discrete-time signal. For the kth channel, the input x(n) is multiplied (demodulated) by the complex exponential $W_M^{-kn} = e(j2\pi kn/M)$ by multiplier /12/. The resulting complex signal is low-pass filtered by the analysis filter h(n) /13/ and down sampled by R:1 using the compressor /14/. The compressor simply discards every (R−1) input samples.

The samples of the STFT are modified by the time-scale modification system, /15/ labled TSM, which will be described in Section 2 below.

Samples of the rate changed speech signal are generated by the short-time Fourier synthesizer /24/ from the modified samples of the STFT. For each of the M frequency channels the samples of the STFT are interpolated by 1:R using the expander /25/, followed by a low-pass filter f(n) /26/. The expander inserts (R−1) zero-valued samples between each of the input samples. By low pass filtering the resulting expanded signal, we have effected the operation of band limited interpolation. Each of the interpolated signals are modulated back to their original frequency bands by multiplication by the complex exponential $W_M^{kn} = e(j2\pi kn/M)$ and the M signals are summed in the summer /28/ to obtain the output signal y(n). The rate-changed speech waveform is then obtained by digital-to-analog conversion of the discrete-time signal y(n) (not shown).

2. Time-Scale Modification System

Let $\beta$ denote the factor by which the speech is to be compressed and suppose that $\beta$ can be expressed as the quotient $\beta = D/I$, of two integers D and I. $\beta > 1$ corresponds to time-scale compression of the speech and $\beta < 1$ corresponds to time-scale expansion. The time-scale modification system (TSM) consists of two basic subsystems: an interpolation/decimation system /16/ and a phase modification system /30/.

The system has two configurations depending upon whether time-scale expansion ($\beta < 1$) or time-scale compression ($\beta > 1$) of the speech is desired. For time-scale expansion the configuration /26/ is used, whereas for time-scale compression /26'/ is used.

The interpolation/decimation system consists of 1:I expander /17/, a low-pass interpolating filter $f_M(n)$ /18/ and a D:1 decimator /19/.

Figure 3:
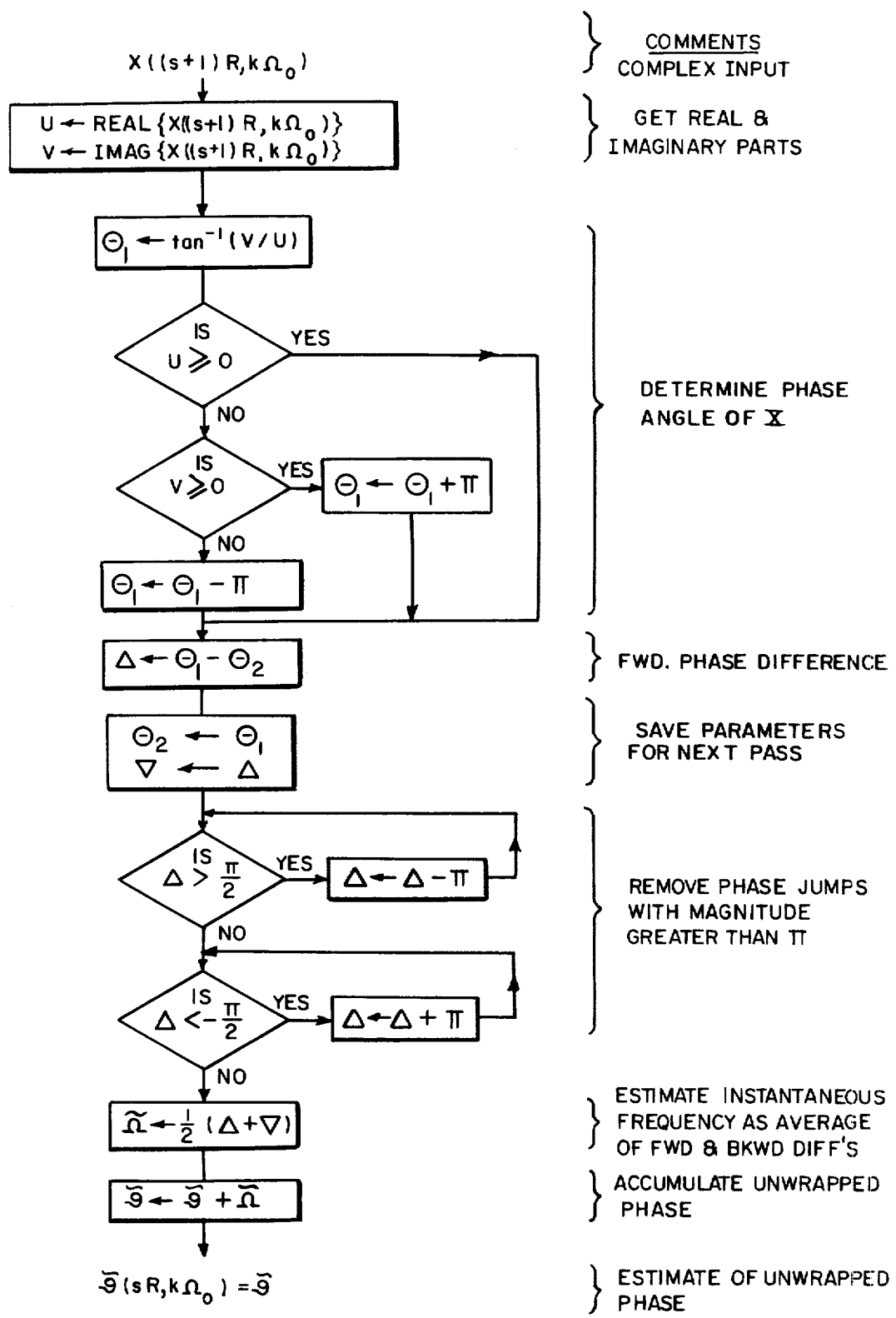
FIG. 3 shows the flow diagram for processing of time-sampled signals to determine the unwrapped phase.

The phase modification system consists of a phase estimator /20/, a real multiplier /21/, a complex exponentiator /22/ and a complex multiplier /23/. The phase estimator /20/ estimates the unwrapped $f_m$ component of the phase of the short-time Fourier transform, and its operation is described by the flowchart in FIG. 3. The exponentiator /22/ is a system that takes a real input and generates a complex output signal whose real component is the cosine of the input and whose imaginary component is the sine of the input.

For the implementation, the input sequence, x(n), was obtained by sampling 5 kHz low-pass filtered speech at the sampling rate of 10 kHz. x(n) was then pre-emphasized using the first-order system $$H_p(z) = 1 - \rho z^{-1} \quad (32)$$

with $\rho = 0.95$. The analysis window was chosen as an N-point Hamming window with N in the range 256 < N < 512, corresponding to analog filter bandwidths of 156 Hz to 78 Hz. The output of the short-time Fourier analyzer was sampled every $R_A \leq N/8$ samples, and the number of frequency samples, M, was fixed at 512. The synthesis was performed assuming the sampling interval, $R_S$, less than N/4. The synthesis filter was an optimal 1:$R_S$ FIR digital interpolating filter designed taking into account the cutoff frequency of the data. For the explicit method of time-scaling the short-time Fourier transform, the interpolating filter $f_M(n)$ was designed with the same technique. The output sequence, y(n) was postemphasized with the system $$H_p^{-1}(z) = 1/(1 - \rho z^{-1}), \quad (33)$$

desampled, assuming the sampling rate of 10 kHz, and low-pass filtered at 5 kHz.

Finally, it is important to note that if the previously described implicit time-scaling method is used exclusively, then the interpolation/decimation system /16/ can be completely eliminated. While reducing the structural complexity of the system, the exclusive use of the implicit time-scaling method will result in an increased amount of computation for certain values of $\beta$. However, in some commercial implementations, it may be desirable to allow only those rate-change factors $\beta$ for which the implicit-only method is sufficiently efficient, thereby trading some flexibility in choice of rate-change factors, for a simplified and more economical structure.

The results of the implementation demonstrate that this system is capable of producing high-quality rate-changed speech for reasonable values of $\beta$, i.e., for compression ratios as high as 3:1 and expansion ratios as high as 4:1. The processed speech retained its natural quality and speaker dependent features and was free from artifacts such as glitches, burbles, and reverberation, often present in vocoded speech. For time-scale expansion by greater than 4:1, the processed speech began to exhibit small amounts of reverberation, due to time-domain aliasing, which one should be able to eliminate by increasing the number of frequency samples, M. For time-scale compression of 4:1, or greater, the processed speech often became rough. Note, however, that while arbitrarily high expansion ratios are physically reasonable, arbitrarily high compression ratios are not. Consider, for example, a voiced phoneme containing four pitch periods. Greater than 4:1 compression reduces this phoneme to less than one pitch period, destroying the periodic character of the phoneme. Thus, one might expect speech, time compressed with high compression ratios, to have a rough quality and low intelligibility.

In addition to producing high-quality rate-changed speech when the original speech was high quality, the system also performed well processing degraded speech. Specifically, speech corrupted by additive Gaussian white noise with 0 dB signal-to-noise ratio was processed with good results.

It is evident that those skilled in the art, once given the benefit of the foregoing disclosure, may make numerous other uses and modifications of, and departures from the specific embodiments described herein without departing from the inventive concepts. Consequently, the invention is to be construed as embracing each and every novel combination of features present in, or possessed by, the apparatus and techniques herein disclosed and limited solely by the scope and spirit of the appended claims.

REFERENCES

Short-Time Fourier Analysis/Sunthesis

[1] Portnoff, M. R., "Implementaiton of the Digital Phase Vocoder Using the Fast Fourier Transform", *IEEE Trans. ASSP*, Vol. ASSP-24, No. 3, June, 1976.

[2] Portnoff, M. R., "Time-Scale Modification of Speech Based on Short-Time Fourier Analysis", Sc.D. Thesis, Department of EE & CS, M.I.T., 1978.

Decimation and Interpolation

[3] Schafer, R. W. and L. R. Rabiner, "A Digital Signal Processing Approach to Interpolation", *IEEE Proc.*, Vol. 61, No. 6, June, 1973.

What is claimed is:

1. A method for slowing the rate of recorded speech comprising, sampling a band-limited analogue speech signal at at least twice the highest frequency of the analogue signal, converting said sampled signal to a digital signal by analog to digital conversion, analyzing said digital signal by short-time Fourier analysis to provide a plurality of channels with complex (real and imaginary components) digital signals, each channel signal corresponding to a band of frequencies of the original speech demodulated down to zero frequency which has been low-pass filtered, reducing the sampling rate of each channel by a factor R where $2\pi/R$ is greater than twice the cut-off frequency in radians of the low-pass filtered channel signal, changing the rate of occurrence of samples of said digital signals by the factor $\beta$ to provide a different sequence of complex discrete time signals $X(n\beta R, k\Omega_o)$ in each channel, each sample of the analyzed digital signal in each channel having a magnitude and phase determined by its real and imaginary components, determining the instantaneous frequency of successive values of said sampled digital signals from the time-rate of change of their successive phase values, summing said values of instantaneous frequency for each sampled signal to obtain a phase value for each sampled signal which is without phase jumps or discontinuities, dividing this unwrapped phase $\theta$ of each of the said signals $X(n\beta R, k\Omega_o) = a(n\beta R, k\Omega_o)e^{j\theta(n\beta R, k\Omega_0)}$ by the factor $\beta (\beta < 1)$ to provide a plurality of sequences of complex discrete time signals $Y(nR, k\Omega_o) = a(n\beta R, k\Omega_o) e^{j\theta(n\beta R, k\Omega_0)/\beta}$ in each channel, providing a short-time Fourier synthesis with a sampling rate increase of 1:R on said plurality of channels of signals $Y(nR, k\Omega_o)$ to provide a time-sampled digital signal of said rate changed speech, converting said rate changed speech digital signal by digital to analog conversion to an analog signal having substantially the same frequencies as in the original analog speech signal but slowed down with respect to the original speech signal.

2. A method for increasing the rate of recorded speech comprising, sampling a band limited analogue speech signal at least twice the highest frequency of the analogue signal, converting said sampled signal to a digital signal by analog to digital conversion, analyzing said digital signal by short-time Fourier analysis to provide a plurality of channels with complex (real and imaginary components) digital signals, each channel signal corresponding to a band of frequencies of the original speech demodulated down to zero frequency which has been low-pass filtered, reducing the sampling rate of each channel by a factor R where $2\pi/R$ is greater than twice the cut-off frequency in radians of the low-pass filtered channel signal, each sample of the analyzed digital signal in each channel having a magnitude and phase determined by its real and imaginary components, determining the instantaneous frequency of successive values of said sampled digital signals from the time-rate of change of their successive phase values, dividing this unwrapped phase $\theta$ of each of the said signals $X(n\beta R, k\Omega_o) = \alpha(n\beta R, k\Omega_o)e^{j\theta(n\beta R, k\Omega_o)}$ by the factor $\beta(\beta > 1)$ to provide a plurality of sequences of complex discrete time signals $Y(nR, k\Omega_o) = \alpha(n\beta R, k\Omega_o) \cdot e^{j\theta(n\beta R, k\Omega_o)/\beta}$ in each channel, changing the rate of occurrence of samples of said digital signals by the factor $\beta$ to provide a different sequence of complex discrete-time signals $X(n\beta R, k\Omega_o)$ in each channel, providing a short-time Fourier synthesis with a sampling rate increase of 1:R on said plurality of channels of signals $Y(nR, k\Omega_o)$ to provide a time-sampled digital signal of said rate changed speech, converting said rate changed speech digital signal by digital to analog conversion to an analog signal having substantially the same frequencies as in the original analog speech signal but slowed down with respect to the original speech signal.

3. A method for eliminating the explicit decimation and interpolation of the values of the short-time Fourier transform in a system for effecting rate changes of speech based on short-time Fourier analysis as in claims 1 or 2 wherein said changing the rate of occurrence of samples of said digital signals by the factor $\beta$ to provide a different sequence of complex discrete time signals $X(n\beta R, k\Omega_o)$ comprises in combination, said short-time Fourier analysis having a decimation rate $R_A$, said division of the unwrapped phase being by the rate change factor $\beta$, and a short-time Fourier synthesizer with interpolation rate $R_S$, the rate-change factor $\beta$ being the quotient of $R_A$ divided by $R_S$.

4. The method of claims 1 or 2 wherein said steps of dividing the unwrapped phase of each of the said signals $X(n\beta R, k\Omega_o) = \alpha(n\beta R, k\Omega_o) e^{j\theta(n\beta R, k\Omega_o)}$ by the factor $\beta$ to provide a plurality of sequences of complex discrete time signals $Y(nR, k\Omega_o) = \alpha(n\beta R, k\Omega_o) e^{j\theta(n\beta R, k\Omega_o)/\beta}$ in each channel is provided by, calculating the cosine and sine of the phase angle of the complex signal to provide the complex real and imaginary parts of said phase angle, multiplying said complex expression of the phase angle by the quantity $(1/\beta - 1)$ to obtain a second complex expression for the phase, multiplying the complex expression of the real and imaginary parts of the sampled signal $X(n\beta R, k\Omega_o) = \alpha(n\beta R, k\Omega_o)e^{j\theta(n\beta R, k\Omega_o)}$ by the said second complex expression for the phase to obtain the sample signal $Y(nR, k\Omega_o) = \alpha(n\beta R, k\Omega_o)e^{j\theta(n\beta R, k\Omega_o)/\beta}$.

* * * * *